United States Patent
Chen et al.

(10) Patent No.: US 7,551,624 B2
(45) Date of Patent: Jun. 23, 2009

(54) SYSTEM TO ENFORCE SERVICE LEVEL AGREEMENTS FOR VOICE-OVER INTERNET PROTOCOL

(75) Inventors: Sean Chen, Sunnyvale, CA (US);
Yongdong Zhao, Pleasanton, CA (US);
Zesen Chen, Pleasanton, CA (US)

(73) Assignee: SBC Knowledge Ventures, L.P., Reno, NV (US)

( * ) Notice: Subject to any disclaimer, the term of this patent is extended or adjusted under 35 U.S.C. 154(b) by 597 days.

(21) Appl. No.: 11/148,948

(22) Filed: Jun. 9, 2005

(65) Prior Publication Data

US 2006/0280184 A1 Dec. 14, 2006

(51) Int. Cl.
*H04L 12/28* (2006.01)
(52) U.S. Cl. .................. 370/395.21; 370/352
(58) Field of Classification Search ........... None
See application file for complete search history.

(56) References Cited

U.S. PATENT DOCUMENTS

| | | | |
|---|---|---|---|
| 6,314,095 B1 | 11/2001 | Loa | |
| 6,643,612 B1 * | 11/2003 | Lahat et al. | 702/186 |
| 6,714,517 B1 * | 3/2004 | Fawaz et al. | 370/236 |
| 6,847,609 B1 * | 1/2005 | Sarnikowski et al. | 370/229 |
| 6,850,525 B2 * | 2/2005 | Mitsumori et al. | 370/395.52 |
| 7,002,919 B1 * | 2/2006 | El-Sayed | 370/252 |
| 7,068,601 B2 * | 6/2006 | Abdelilah et al. | 370/231 |
| 7,173,910 B2 * | 2/2007 | Goodman | 370/252 |
| 7,272,115 B2 * | 9/2007 | Maher et al. | 370/253 |
| 7,286,550 B2 * | 10/2007 | Modali et al. | 370/412 |
| 7,346,000 B1 * | 3/2008 | Srinivasan et al. | 370/235 |
| 7,376,132 B2 * | 5/2008 | Conway | 370/389 |
| 7,489,631 B2 * | 2/2009 | Ilan | 370/230.1 |
| 2003/0012138 A1 * | 1/2003 | Abdelilah et al. | 370/231 |
| 2003/0086140 A1 | 5/2003 | Thomas et al. | |
| 2003/0174650 A1 * | 9/2003 | Shankar et al. | 370/235 |
| 2003/0235209 A1 | 12/2003 | Garg et al. | |
| 2004/0028041 A1 * | 2/2004 | Yasue | 370/389 |
| 2005/0052994 A1 | 3/2005 | Lee | |
| 2006/0218302 A1 * | 9/2006 | Chia et al. | 709/245 |

OTHER PUBLICATIONS http://www.manually.sk/protocols2/voip/rtp_header.htm, pp. 1-2, Jun. 6, 2005.
http://www.erg.abdn.ac.uk/user.gorry/course/inet-pages/ip-packet.html., IP Packet Header, pp. 1-2, May 30, 2005.
http://www.networksorcery.com/enp/protocol/udp.htm., pp. 1-4, Jun. 6, 2005.

\* cited by examiner

*Primary Examiner*—Phirin Sam
(74) *Attorney, Agent, or Firm*—Brinks Hofer Gilson & Lione

(57) ABSTRACT

A communications system is described for enforcing a service level agreement for a specified customer on a network. The communications system includes a router to receive at least one packet containing data. A management system is in communication with the router, where the management system provides access control commands to the router for the specified customer based upon an agreed upon codec and an agreed upon packet length. A detection system is in communication with the router. The detection system extracts a codec information and a packet length information from the packet. If the codec matches the agreed upon codec and the packet length matches the agreed upon packet length, then the packet is allowed to proceed. Otherwise the packet is dropped from the network.

14 Claims, 7 Drawing Sheets

Table 1: The Parameter Combinations OF SLA

| Bandwidth Allocation | CODEC | Packetization Delay (ms) |
|---|---|---|
| 0%, 20%, 40%, 60%, 100% | G.711 | 10,20,30,40 |
| 0%, 20%, 40%, 60%, 100% | G.723ar53 | 30, 60 |
| 0%, 20%, 40%, 60%, 100% | G.723ar63 | 30, 60 |
| 0%, 20%, 40%, 60%, 100% | G.726r16 | 10,20,30,40 |
| 0%, 20%, 40%, 60%, 100% | G.726r24 | 10,20,30,40 |
| 0%, 20%, 40%, 60%, 100% | G.726r32 | 10,20,30,40 |
| 0%, 20%, 40%, 60%, 100% | G.728 | 10,20,30,40 |
| 0%, 20%, 40%, 60%, 100% | G.729 | 10,20,30,40 |

Fig.4

| Codes And Packetization Delay (ms) | Packet Length (bytes) |
|---|---|
| G.711, 10 | 120 |
| G.711, 20 | 200 |
| G.711, 30 | 280 |
| G.711, 40 | 360 |
| G.723ar53, 30 | 60 |
| G.723ar53, 60 | 80 |
| G.723ar53, 30 | 64 |
| G.723ar63, 60 | 88 |
| G.726r16, 10 | 60 |
| G.726r16, 20 | 80 |
| G.726r16, 30 | 100 |
| G.726r16, 40 | 120 |
| G.726r24, 10 | 70 |
| G.726r24, 20 | 100 |
| G.726r24, 30 | 130 |
| G.726r24, 40 | 160 |
| G.726r32, 10 | 80 |
| G.726r32, 20 | 120 |
| G.726r32, 30 | 160 |
| G.726r32, 40 | 200 |
| G.728, 10 | 60 |
| G.728, 20 | 80 |
| G.728, 30 | 100 |
| G.728, 40 | 120 |
| G.729, 10 | 50 |
| G.729, 20 | 60 |
| G.729, 30 | 70 |
| G.729, 40 | 80 |

SYSTEM TO ENFORCE SERVICE LEVEL AGREEMENTS FOR VOICE-OVER INTERNET PROTOCOL

FIELD OF THE INVENTION

The invention relates to a system and method for enforcing service level agreement for voice-over Internet protocol (VoIP) traffic on a communications network.

BACKGROUND

Voice-over Internet protocol (VoIP) services have been gaining much attention from communication service providers, their customers and potential customers. VoIP is voice delivered on a network using an Internet Protocol. In general, this means sending voice information in digital form in discrete packets rather than in the traditional circuit-committed protocols of the public switched telephone network (PSTN). Communication service providers are using VoIP technology to offer end users more cost-effective voice services across the provider's data infrastructure. These services are typically delivered to customers through a broadband access network, such as a digital subscriber line (DSL) access network. VoIP technology may be used as the foundation for new multimedia communication services that may address mobility and cost reduction concerns to customers. VoIP may also optimize the communication service providers' PSTN network costs, such as when used to transport bulk voice traffic over a shared IP data network.

To ensure the quality of communication messages sent using VoIP, VoIP imposes stringent quality of service (QoS) constraints such as on network mouth-to-ear delay, jitter and packet loss. Mouth-to-ear delay is the delay incurred from the moment the speaker utters words until the instant the listener hears them. The mouth-ear-delay for VoIP-based communications should not exceed 150 ms. The end-to-end jitter may be limited to less than 30 ms and packet loss ratio should not exceed more than 0.5%. To achieve such a level of QoS, the communication service provider may have to provision a large amount of network resources, such as bandwidth, to support the VoIP application. Network bandwidth demanded by VoIP traffic may be closely tied to the codec and the packetization delay used by the VoIP codec. To offer such high-quality calls, communication service providers may have to overprovision resources by assuming a worst combination of all possible codec and packetization delay during service provisioning, which can be costly and inefficient.

BRIEF DESCRIPTION OF THE DRAWINGS

FIG. 4 is a table listing exemplary bandwidth allocations for determined codecs and packetization delay.

FIG. 5 is a table listing packet lengths for a determined codec and packetization delay.

DETAILED DESCRIPTION

To ensure high-quality packetized voice calls using voice-over Internet protocol (VoIP), communications service providers may offer services that restrict the customers to the use of specified codecs and determined packetization delays. More particularly, communication service providers may detect causes for packet-based delay and congestion on the communications network. The system may be used to selectively drop communications that do not conform to the specified codecs and determined packetization delays.

Figure 1:
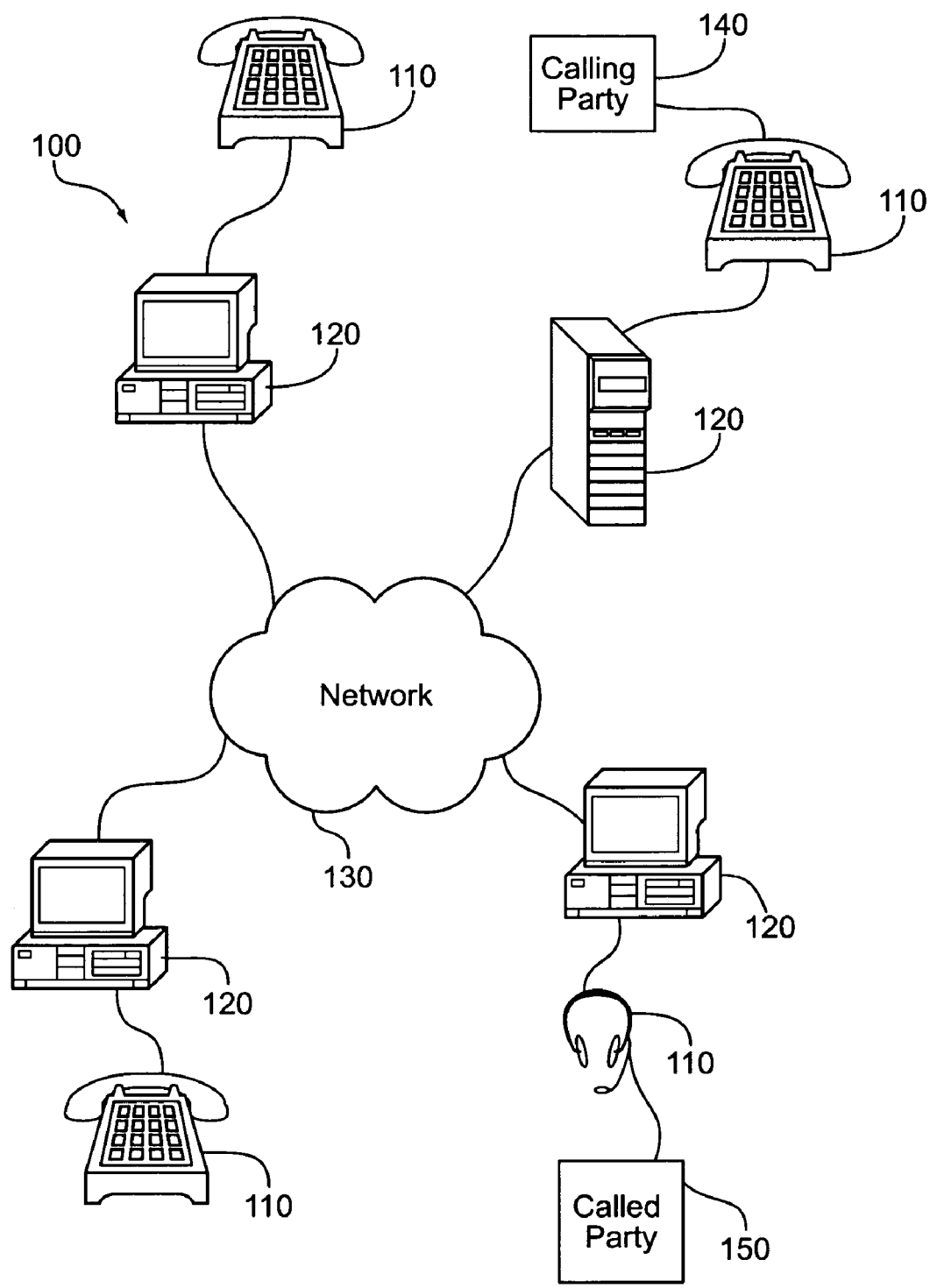
FIG. 1 is a block diagram of a communications system.

FIG. 1 is a block diagram of a communications system 100 that provides voice communications using packet-based messages. The communications system allows for a calling party 140 and a called party 150 to speak to each other in substantially real time. The communications system 100 includes communication devices 110 that connect to each other via processors 120 over a network 130 such as an Internet protocol (IP) network. The communications devices 110 include voice-type communications devices including telephones, such as phones used with landlines, mobile phones, satellite phones, BLACKBERRY's and the like such as computers having a microphone and a speaker. The communications devices 110 may include hand-held or hands-free devices. The processors 120 may be included in such devices such as desk top computers, laptop computers and servers. The communications devices 110 and the processors 120 may be implemented as one or more physical devices.

The network 130 includes local area networks (LANs) and wide area networks (WANs), such as the Internet. The network 130 may be implemented with a network based virtual private network (VPN or NVPN) service. A VPN is a network that may be constructed by using public wires to connect nodes. The VPN may enable the communication service provider to create networks using a packet-switching network such as the Internet as the medium for transporting data. VPN systems may use encryption and other security mechanisms to ensure that only authorized users can access the network and that the data cannot be intercepted.

In a packet-switching network, the voice and non-voice data in a message or file may be broken up into a sequence of packages. Each of these packages gets a wrapper that includes information on the sender's address, the receiver's address, the package's place in the entire message, and how the receiving computer can identify that the package arrived intact. Each data package, called a packet, is then sent off to its destination via a best available route. The route of one packet may be taken by all, some or none of the other packets in the message. The network 130 may balance the load across various pieces of equipment on a millisecond-by-millisecond basis. The packets may travel through copper cables, fiber optics, microwaves and satellites and the like. The recipient may communicate with the sender in substantially real time.

Being able to communicate in substantially real time means that communications, such as voice communications, from the calling party 140 to the called party 150 may occur substantially immediately. Conversely, non-substantially real time communications, such as sending a text message as a .WAV file via email, may cause a recipient of the message to take a few seconds, or even minutes, to respond. Real time can also refer to events simulated by a computer at the same speed that they would occur in real life. The network 130 provides the users with the sense of real time communications that they may experience when speaking with each other using traditional circuit-committed telephone communications.

Figure 2:
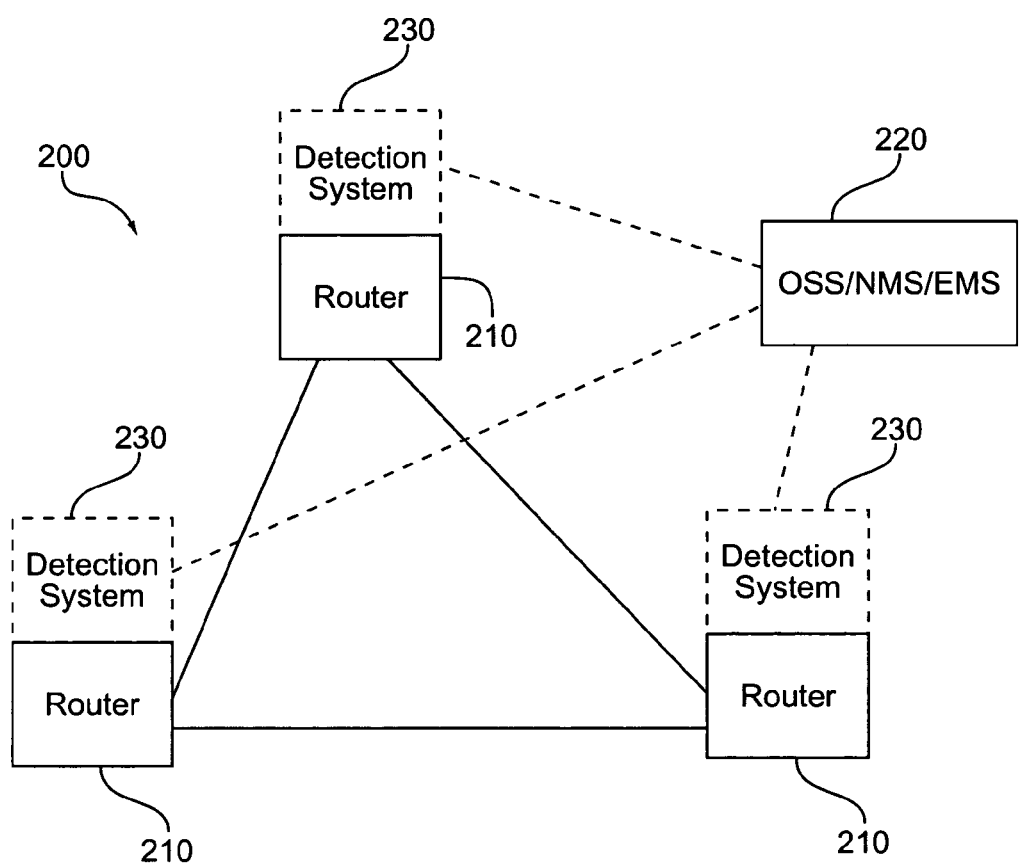
FIG. 2 is a block diagram illustrating exemplary components of the network of the communications system.

FIG. 2 is a block diagram illustrating exemplary components 200 of the network 130. The components 200 include at least one router 210 that connects with an operating support system (OSS), network management system (NMS) and/or element management system (EMS). TELCORDIA TECHNOLOGIES and SYNDESIS are examples of companies that produce systems that may be deployed by the communications service provider. The OSS, NMS and/or EMS include logic such as software, hardware and/or firmware systems that operators of the communications service provider may use to control and monitor their networks. The software includes operatable routines stored in a memory medium. The memory medium refers to any computer storage mechanism that supports a magnetic storage medium, an optical storage medium, an electronic storage medium, or any other suitable storage medium, as described in more detail below. The router 210 may include specialized computers and applications that send the packet-based messages between networks, such as between a network of the calling party 140 and a network of the called party 150.

The router 210 includes a detection system 230. The detection system 230 may be implemented with software, hardware, and/or firmware. The detection system 230 allows communication service providers to detect a codec, and also to detect other network variables such as packet length and/or packetization delay used by a VoIP call. Information about the codec and packetization delay may be used to help provide better service to the customers, as will be described in more detail below. The detection system 230 may be implemented together with or separate from the router 210. Each router 210 may include a detection system 230 or the routers may share one or more detection systems 230.

Figure 3:
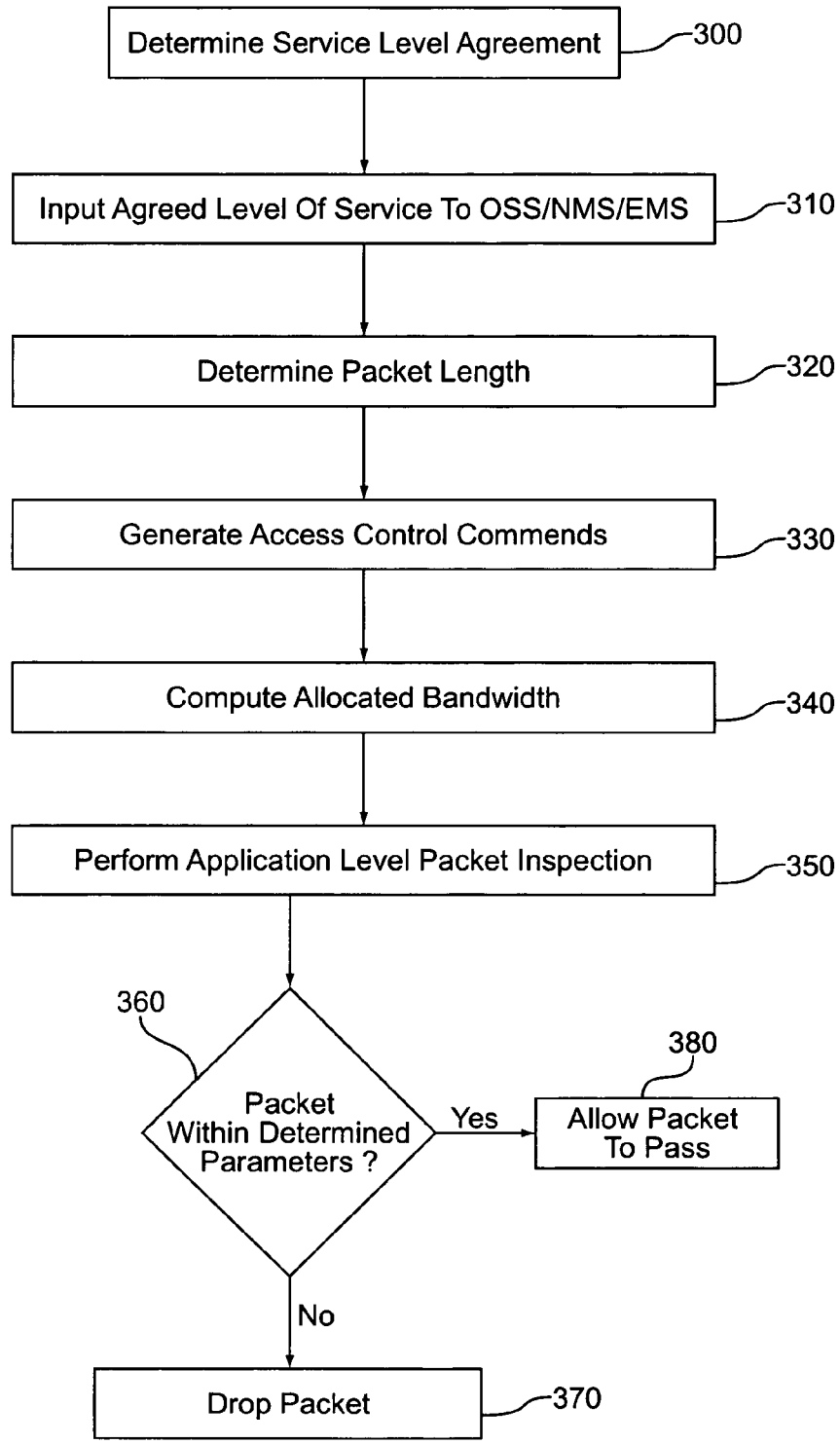
FIG. 3 is a flow chart illustrating service provisioning and service level agreement enforcement.

FIG. 3 is a flow chart illustrating operation of the detection system 230, such as for service provisioning and service level agreement enforcement. At block 300, a service level agreement (SLA) is determined in terms of bandwidth allocation, codec type, and packetization delay.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories; or a signal containing computer instructions being sent in a network environment. A digital file attachment to e-mail or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

Accordingly, the present invention contemplates a computer readable medium containing instructions, or that which receives and executes instructions from a propagated signal so that a device connected to a network environment can send or receive voice, video or data, and to communicate over the network using the instructions. The instructions form one or more routines that are executable to permit the device to operate in a desired manner.

Additionally, it will be understood that a device of the present invention includes broadly any electronic device that provides voice, video or data communication, such as a telephone, a cordless telephone, a mobile phone, a cellular telephone, a Personal Digital Assistant (PDA), a set-top box, a computer, and/or a server.

FIG. 4 is a table listing exemplary bandwidth allocations of 0%, 20%, 40%, 60% and 100% for determined codecs and packetization delay. The exemplary bandwidth allocations are a percentage of total link bandwidth allocated to VoIP traffic. Customers may choose to specify either the codec type, packetization delay, both or neither. If the customer chooses not to specify codec type and packetization delay, then bandwidth allocation for the worst case among all combinations of covec and packetization delay may assumed. In another example, the customer may choose to enter into an agreement for 20% bandwidth allocation, a G.711 codec and 10 ms packetization delay.

Referring also to FIG. 3, at block 310, an operator of the network 130 can input the agreed upon level of service, e.g. 20% bandwidth allocation, a G.711 codec and 10 ms packetization delay to the OSS/NMS/EMS 220. At block 320, the OSS/NMS/EMS 220 translates the codec and packetization delay into payload type and packet length for Real-Time Transfer Protocol (RTP) packets. FIG. 5 is a table 500 listing packet lengths for a determined codec and packetization delay. The table 500, such as a look-up table, can be stored in memory on the OSS/NMS/EMS 220.

At block 330, the OSS/NMS/EMS 220 generates access control commands based upon the determined payload type (the combination of protocol type RTP and codec type) and packet length. The customer may view the access control commands via an interface, such as via processor 120. The customer may set the codec type or payload type as a wildcard, and/or set the packet delay as a wildcard. The OSS/NMS/EMS 220 then generates network access control commands accordingly. The access control commands are sent to the routers 210.

At block 340, the bandwidth allocated for VoIP traffic may be determined from the service level agreement. The actual bandwidth may asl be computed based upon factors such as the percentage allocated for VoIP traffic and other factors such as access link type, line card type, codec and packetization delays, and the like.

At block 350, when the access control commands are configured, the router 210 extracts a field of a packet header for inspection. If the VoIP traffic is sent using Real-Time Transport Protocol (RTP), an Internet protocol for transmitting real-time data such as audio and video, the router inspects the RTP header. RTP does not guarantee real-time delivery of data, but provides mechanisms for the sending and receiving applications to support streaming data.

Figure 6:
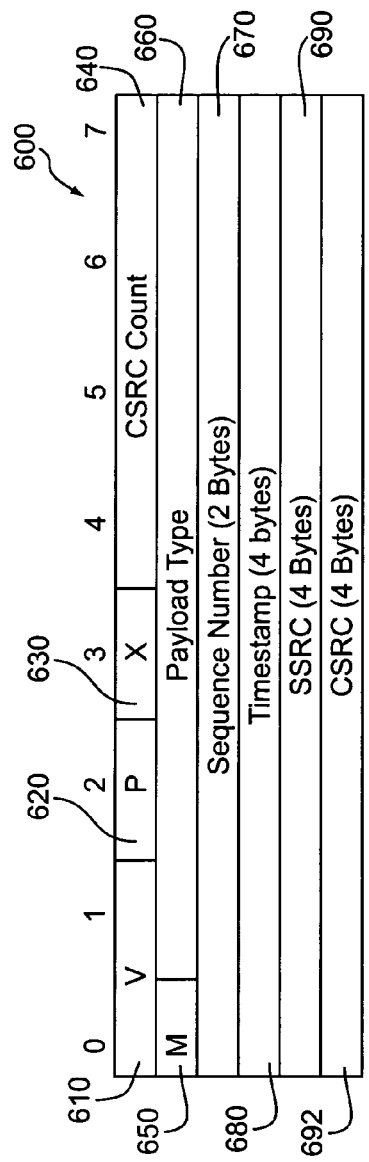
FIG. 6 is a diagram of an RTP header.

FIG. 6 is a diagram of an RTP header 600. The RTP header 600 includes a version field 610 that identifies the RTP version and a padding packed 620, which, when set, indicates that the packet contains one or more additional padding octets at the end of the packet, which are not part of the payload. The RTP header 600 also includes a RExtension bit 630, which, when set, indicates that the fixed header is followed by exactly one header extension, with a defined format. The RTP header 600 also includes a CSRC count 640 which contains the number of CSRC identifiers that follow the fixed header. Marker 650 allows events such as frame boundaries to be marked in the packet stream. Payload type field 660 identifies the codec used by the VoIP call. The sequence number 670 increments by one for each RTP data packet sent, the timestamp 680 reflects the sampling instant of the first octet in the RTP data packet, the SSRC 690 identifies the synchronization source, and the CSRC 692 identifies the contributing sources for the payload contained in the packet.

RTP may run on top of a User Datagram Protocol (UDP), although the specification is general enough to support other transport protocols such as Transmission Control Protocol (TCP). UDP is a connectionless protocol that may send a message without establishing a connection with the recipient, by sending the message to the network 130 with a destination address. In contrast, connection-oriented protocols require a channel to be established between the sender and receiver before any messages are transmitted. UDP/IP offers a direct way to send and receive datagrams over an IP network. The IP may use UDP for broadcasting RTP messages over a network.

Figure 7:
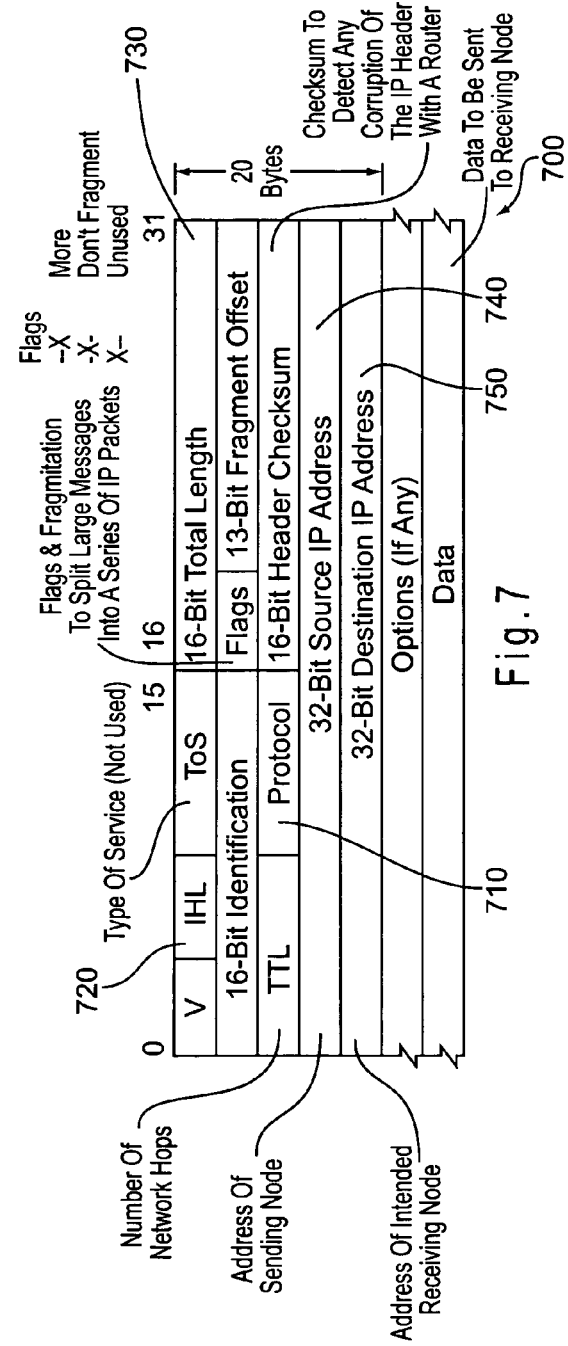
FIG. 7 is a diagram of an IP header.

FIG. 7 is a diagram of an IP header 700. Among other fields, the IP header 700 includes a protocol field 710 which identifies the type of transport protocol to be used, such as UDP. The IP header 700 also includes an IP header length field 720 which identifies the length of the header in 32-bit words. A size of datagram field 730 includes the size of the header plus the data. The IP header also includes a 32-bit source IP address 740 and a 32-bit destination IP address 750.

Figure 8:
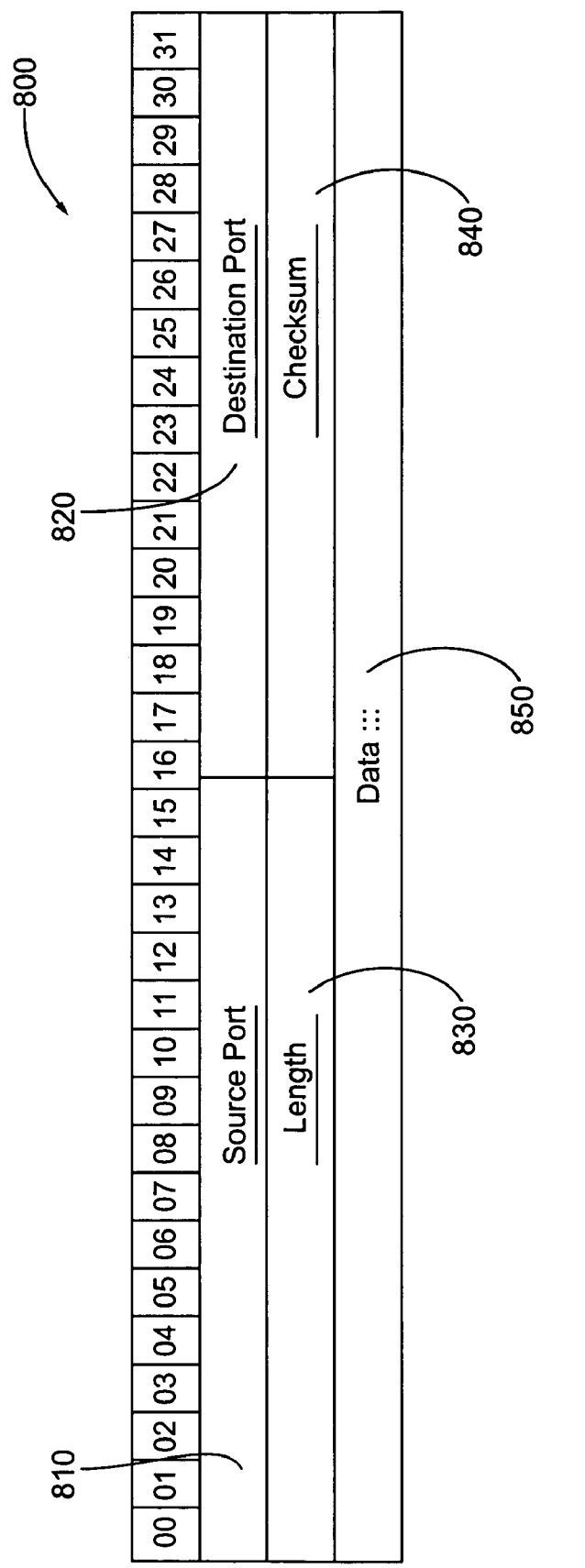
FIG. 8 is a diagram of a UDP header.

FIG. 8 is a diagram of a UDP header 800. The UDP header 800 includes a source port field 810 that is used to identify a port number of the sender. A destination port field 820 is also included which identifies a port that the packet is addressed to. A length field 830 includes the length, in bytes, of the UDP header and encapsulated data. A checksum field 840 may be used to help ensure an accurate transmission of data. The data is contained in a data filed 850.

Referring again to FIG. 3, block 350, the router 210 uses the VoIP traffic from the extracted payload type field 460 of the RTP header 400 to identify the VoIP codec. At block 330, the router 210 determines and records the length of the packet, header plus payload, from a packet length field of an IP header. At block 340, the router 210 determines and records the source IP address 540 and destination IP address 550 pair and the source/destination port number pair of the VoIP packet from the UDP header 800. The router 210 may send the recorded information to the OSS/NMS/EMS 220 for analysis.

At block 360, the OSS/NMS/EMS 220 may determine with the codec type and/or packetization delays of the packets are within those specified by the SLAs. At block 370, if the codec type and/or the packetization delay are not within the specified terms, the packet may be dropped. Such dropping of the packet may help to prevent network congestion to the other customers. Therefore, the Qos of the conforming traffic may be protected. At block 380, if the codec type and/or the packetization delay are within the specified terms, the router 210 allows the packet to pass.

While the invention has been described above by reference to various embodiments, it will be understood that many changes and modifications can be made without departing from the scope of the invention. It is therefore intended that the foregoing detailed description be understood as an illustration of the presently preferred embodiments of the invention, and not as a definition of the invention. It is only the following claims, including all equivalents, which are intended to define the scope of this invention.

We claim:

1. A communications system for enforcing a service level agreement for a specified customer on a network, the communications system comprising:

a router to receive at least one packet containing data;

a management system in communication with the router, where the management system provides access control commands to the router for the specified customer based upon an agreed upon codec and an agreed upon packet length;

a detection system in communication with the router, the detection system to extract a codec information and a packet length information from the packet; and if the detected codec matches the agreed upon codec and the detected packet length matches the agreed upon packet length, then the router allows the packet to proceed, otherwise the router drops the packet from the network, and a reason for the dropped packet is reported to the specified customer.

2. The communications system of claim 1, where the management system further includes a look-up table that relates the codec information and a packetization delay to the packet length information.

3. The communications system of claim 1, where the management system includes at least one of a network management system, an element management system and an operations support system.

4. The communications system of claim 1, where the detection system extracts the codec information from a header of a real-time transport protocol.

5. The communications system of claim 1, where the detection system extracts the packet length information from a header of an Internet protocol.

6. The communications system of claim 1, where the detection system comprises a software application stored in a memory of the router.

7. The communications system of claim 1, where the detection system further determines the packetization delay.

8. The communications system of claim 7, where, if the determined packetization delay does not match an agreed upon packetization delay, the packet is dropped from the network.

9. A method for enforcing a service level agreement of a specified customer on a network traffic, comprising:

determining an agreed upon codec and an agreed upon packet length for the specified customer;

providing access control commands to the router for the specified customer based upon the agreed upon codec and an agreed upon packet length;

receiving from the specified customer at least one packet containing data;

extracting a codec information and a packet length information from the packet;

if the codec matches the agreed upon codec and the packet length matches the agreed upon packet length, then allowing the packet to proceed, otherwise dropping the packet from the network; and reporting to the specified customer a reason for the dropped packet.

10. The method of claim 9, further including accessing a look-up table that relates the codec information and a packetization delay to the packet length information.

11. The method of claim 9, where the codec information is extracted from a header of a real-time transport protocol.

12. The method of claim 9, where the packet length information is extracted from a header of an Internet protocol.

13. The method of claim 9, further comprising determining the packetization delay.

14. The method of claim 13, where, if the determined packetization delay does not match an agreed upon packetization delay, dropping the packet from the network.

* * * * *